June 12, 1934.   G. R. POWELL   1,962,649
POWER VEHICLE BRAKE OPERATING SYSTEM
Filed April 15, 1932
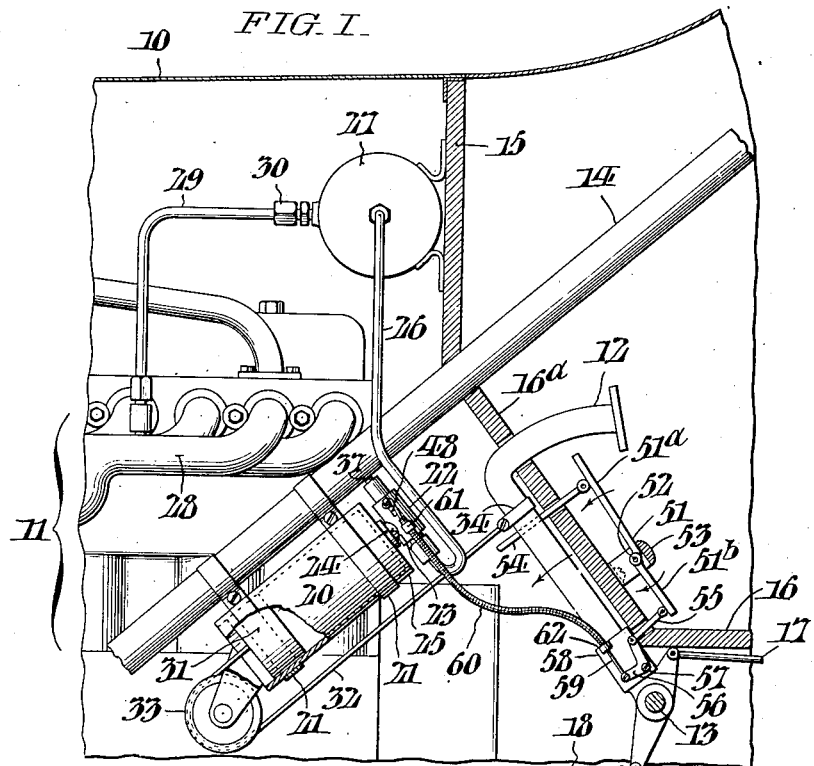
INVENTOR:
George R. Powell,
BY Fraley & Paul
ATTORNEYS.

Patented June 12, 1934

1,962,649

UNITED STATES PATENT OFFICE 1,962,649

POWER VEHICLE BRAKE OPERATING SYSTEM

George R. Powell, Villa Nova, Pa.

Application April 15, 1932, Serial No. 605,378

2 Claims. (Cl. 121—38)

This invention relates to systems for power operation of the brake mechanisms of automobiles and the like; and it has reference more particularly to brake operating systems in which air tension is employed as the power medium.

In the main, my invention is directed toward provision of a vacuum vehicle brake operating system of the specific kind referred to which is simple in construction and composed of parts capable of compact arrangement and accommodation within the engine hood of the vehicle; and which is moreover capable of automatic compensative action to hold the brakes at any desired degree of pressure under control of the driver.

Other objects and attendant advantages of this invention will be manifest from the detailed description following considered in connection with the attached drawing; wherein, Fig. I is a fragmentary view showing a part longitudinal section of an automobile fitted with my improved auxiliary power brake mechanism.

Fig. II shows the longitudinal sectional view of a control valve embodied in my power brake operating system.

Figs. III and IV are views like Fig. II showing the control valve in different positions; and, Fig. V is a cross section of the control valve taken as indicated by the arrows V—V in Fig. II.

With reference first more particularly to Fig. I of these illustrations, the numeral 10 designates the hood of the automobile, which encloses the engine 11, while the usual foot brake pedal is indicated at 12, the pedal shaft at 13, the steering column at 14, the dash board at 15 and the foot board at 16. After common practice, the motion of the brake pedal 12 is transmitted to the brake units (not shown) at the wheels of the vehicle, through the medium of a link 17, the rotation of the pedal shaft 13 being yieldingly opposed by the helical tension spring indicated at 18, all in the well known manner.

For the purpose of operating the brakes of the vehicle, in accordance with my invention I provide, as shown in Fig. I, a vacuum operating system which includes a pneumatic actuator in the form of a power cylinder 20 which is rigidly secured, in this instance, to the steering column 14 within the hood 10 by means of a pair of clamp straps 21. At one end, the power cylinder 20 is fitted with a control valve 22 whereof the threaded neck 23, Figs. I and V, is secured into a tapped central boss 24 of the head 25 of said cylinder. Connecting into one end of the cylindric body of the control valve 22 is a tube 26 that leads from a reserve vacuum tank 27 which is secured to the dash board 15 and which is in turn connected to the suction manifold 28 of the engine 11 by means of a tube 29 having interposed therein a suitable conventional form of check valve 30. Reciprocative in the actuator cylinder 20 is a piston 31 which is connected by means of a cable 32 to the brake pedal 12, said cable passing over a guide sheave 33 at the bottom end of the power cylinder 20, and being made fast to a clamp collar 34 secured to the pedal lever at a point remote from its fulcrum axis 13.

By reference now to Figs. II—V, it will be observed that the body of the control valve 22 is closed at one end by a screw cap 35 having an axial sleeve extension 36 for guidance of the stem 37 of the valve. Secured to the inner end of the stem 37 is a closure member 38, which under the influence of suction in the tube 26 connecting into the valve body at the corresponding end is normally held against the seat 39 around the suction port 40 within the valve body. Mounted on the stem 37 with capacity for independent axial movement is a larger closure member 41 which is normally held away from a seat around the suction relief port 42 at one end of the smaller chamber 43 within the valve body, by means of a helical spring 44 in compression between said closure member and the closure member 38 previously referred to. As shown, the chamber 43 communicates via the neck 23 of the valve body with the power cylinder 20; while the larger chamber 45 within the valve body is in communication with the atmosphere via a circumferential series of lateral ports 46. Pivotally connected at 47 to the valve stem 37 within the chamber 45 of the valve 22 is an actuating lever 48 that extends to the exterior through a longitudinal slot 49 in the body of said valve. As shown in Figs. II—IV, the actuating lever 48 is formed adjacent its fulcrum 47 with a cam projection 50 against which the air port closure member 41 is yieldingly urged by the spring 44.

As a means for operating the control valve 22, I employ a supplemental master control pedal 51 of the type disclosed in U.S. Patent No. 1,630,760 granted to me on May 31, 1927, said supplemental pedal being located to one side of the usual brake pedal 12. It is to be particularly noted that this supplemental pedal 51 comprises heel and toe components 51a and 51b which are swingable independently on an axis 52 in a bracket 53 secured to the inclined section 16a of the foot board 16. As in the patent supra, the toe portion 51a of the pedal 51 is utilized to control the carburetor (not shown) of the engine 10 through the link connection partly illustrated at 54. The heel component 51b is employed, on the other hand to operate the control valve 22 through a system of coordinated motion translating elements including a link 55, a bell crank lever 56 with fulcrum support at 57 on a plate 58 clamped to the brake pedal 12 immediately adjacent its axis 13, and a Bowden wire 59 whereby said bell crank lever is coupled with the cam lever 48 of the control valve 22. As illustrated, the sheathing tube 60 for the Bowden wire 59 is secured at one end to an apertured lug 61 on the body of the control valve 22 and at the other end in an apertured lug 62 on the plate 58.

The operation of my pneumatic brake operating system is as follows: Upon depression of the heel end 51b of the supplemental pedal 51 and attendant pull on the Bowden wire 59, actuating cam lever 48 of the valve 22 is moved from the normal position of Fig. II, through the position of Fig. III, to the position shown in Fig. IV. The air port closure member 41 is thereby first moved independently along the valve stem 37 into contact with its seat 42 as shown in Fig. III in opposition to the spring 44, and thereby shuts off communication between the chamber 43 and the chamber 45, which latter, as hereinbefore explained, is open to the atmosphere via the lateral ports 46 in the valve body. With the air port 42 now closed, the actuating cam lever 48 is continuing its movement counterclockwise as indicated by the arrow thereon in Fig. III, reacts upon the air port closure member 41 and thereby causes the stem 37 to be shifted to the left as also indicated by an arrow in Fig. III with the result that the suction port closure member 38 is retracted from its seat 39 against the force of the spring 44 and with attendant establishment of communication between the reserve vacuum tank 27 and the power cylinder 20 by way of the chamber 43 in the control valve 22. The piston 31 in the power cylinder 20 thereupon responds immediately to the action of the suction, and, in moving upward within said cylinder, causes pull on the cable 32, which movement is imparted to the usual brake pedal 12 and in turn transmitted through the coupling rod 17, to the brake units at the wheels of the vehicle to check the speed of the latter. Now as the usual brake pedal 12 changes its position, a compensative re-action takes place with the section 51b of the master control pedal 51 held partly depressed, between the bell crank lever 56 and the Bowden wire 59, such that the stem 37 of the valve 22 is ultimately released to the action of the spring 44 and the suction port closure member 38 thereby urged to its seat 39, without attendant retraction however of the relief port closure member 41. The power cylinder 20 is thus maintained under a definite degree of pneumatic tension or suction, with maintenance of brake application to a corresponding degree. If the heel section 51b of the master pedal 51 is now further depressed, a repetition of the operative cycle of the system occurs with impartation of further movement to the usual brake pedal 12 and with attendant application of greater braking pressure. Here again, due to re-action through the bell crank 56 and the Bowden wire 59 upon the actuating lever 48 of the control valve 22, the brakes are held at the increased pressure newly established. Accordingly, it will be seen that the effective braking action increases in degree with depression of the heel section 51b of the master control pedal 51. It therefore follows that with the pneumatic operating system of my invention, the brakes may be applied gradually and progressively and maintained in different degrees of pressure in exact simulation of service braking with the usual brake pedal 12. The only effort necessary to the action with the system of my invention is to overcome the spring 44 of the control valve 22 whereof the resistance is negligible as compared with the severe effort required in ordinary manual brake application by means of the usual pedal 12. When the heel section 51b of the master control pedal 51 is depressed to the fullest extent as in emergencies, the compensative action above referred to cannot take place so that the closure member 38 is held fully retracted from its seat 39 for application of the brakes under the full power of the vacuum in the reserve tank 27. Upon release of the heel section 51b of the master control pedal 51 after a brake application, the spring 44 in the control valve 22 operates to shift the valve stem 37 to the right with attendant closure of the suction port 40 by the closure member 38, and when this is accomplished, reacts with the said closure member 38 and causes the air port closure member 41 to be forced away from its seat 42 to break the vacuum in the power cylinder 20 which is thereby relieved via the ports 46. All the parts are thus restored to the normal position shown in Fig. II by the spring 44, with the closure member 38 held tightly against its seat 39 through the combined action of said spring and the suction within the reserve reservoir 27.

From the foregoing it will be seen that the power brake operating system of my invention is of few parts which are readily applicable to any standard form of automobiles and accommodatable within the confines of the engine hood. The system is moreover absolutely reliable in operation and capable of automatic compensative action to hold the brakes at any desired degree of pressure under control of the driver.

Having thus described my invention, I claim:

1. A control valve for power braking systems comprising a cylindrical body with bores of differential diameter and an axial suction port through one end thereof, means whereby the axially ported end is connectible to a source of vacuum, a screw cap with an axial sleeve extension closing in the other end of the cylindrical body, a stem guided by the sleeve extension and having an attached valve component at its inner end normally coacting with a seat around the suction port inner end, an actuating lever with a cam projection pivoted to the valve stem, an air port closure member normally in open position relative to a seat around the larger bore of the cylindrical body, a spring in compression between the suction valve component and the air port closure member, and mechanism whereby the actuating lever is moved to first effect shifting of the air port closure member and thereafter re-act with said member to move the valve stem with attendant retraction of the suction port valve component, for the purpose specified.

2. A control valve for power braking systems comprising a cylindrical body with bores of differential diameter and an axial suction port through one end thereof, means whereby the axially ported end is connectible to a source of vacuum, a screw cap with an axial sleeve extension closing in the other end of the cylindrical body, a stem guided by the sleeve extension and having an attached valve component at its inner end normally coacting with a seat around the suction port inner end, an actuating lever with a cam projection pivoted to the valve stem and projecting through a longitudinal slot in the cylindrical body, an air port closure member normally in open position relative to a seat around the larger bore of the cylindrical body, a circumferential series of radial ports outwardly of said seat in communication with the atmosphere, a spring in compression between the suction valve component and the air port closure member, and mechanism whereby the actuating lever is moved to first effect shifting of the air port closure member and thereafter re-act with said member to move the valve stem with attendant retraction of the suction port valve component, for the purpose specified.

GEORGE R. POWELL.